(12) United States Patent
Kofman

(10) Patent No.: US 12,404,148 B2
(45) Date of Patent: Sep. 2, 2025

(54) ADAPTOR FOR PROVIDING AN ADJUSTABLE CONNECTION BETWEEN AN ENDPIECE OF A LIFTING APPARATUS AND A NACELLE, AND METHOD OF USING SAME

(71) Applicant: Vestas Wind Systems A/S, Aarhus N (DK)

(72) Inventor: Joris Kofman, Aalborg Øst (DK)

(73) Assignee: Vestas Wind Systems A/S, Aarhus N. (DK)

( * ) Notice: Subject to any disclaimer, the term of this patent is extended or adjusted under 35 U.S.C. 154(b) by 274 days.

(21) Appl. No.: 18/267,646

(22) PCT Filed: Dec. 9, 2021

(86) PCT No.: PCT/DK2021/050361
§ 371 (c)(1),
(2) Date: Jun. 15, 2023

(87) PCT Pub. No.: WO2022/128030
PCT Pub. Date: Jun. 23, 2022

(65) Prior Publication Data
US 2024/0051796 A1    Feb. 15, 2024

(30) Foreign Application Priority Data

Dec. 18, 2020 (DK) .......................... PA 2020 70856

(51) Int. Cl.
*B66C 1/10* (2006.01)
*B66C 1/66* (2006.01)
(Continued)

(52) U.S. Cl.
CPC ............... *B66C 1/108* (2013.01); *B66C 1/66* (2013.01); *F03D 13/10* (2016.05); *F03D 13/116* (2023.08);
(Continued)

(58) Field of Classification Search
CPC .......... B66C 1/108; B66C 1/66; F03D 13/10; F03D 13/116; F03D 13/40; F03D 13/403;
(Continued)

(56) References Cited

U.S. PATENT DOCUMENTS 3,530,947 A * 9/1970 Gendron ................. E02D 15/04
405/249
5,690,457 A * 11/1997 Smetz .................. F16B 45/002
81/436
(Continued)

FOREIGN PATENT DOCUMENTS

CN    108190725 A    6/2018
CN    109969929 A    7/2019
(Continued)

OTHER PUBLICATIONS

International Searching Authority, International Search Report and Written Opinion issued in corresponding PCT Application No. PCT/DK2021/050361, dated Feb. 24, 2022.
Danish Patent and Trademark Office, examination report issued in corresponding Danish Patent Application No. PA 2020 70856, dated Jun. 7, 2021.

*Primary Examiner* — Ryan J. Walters
(74) *Attorney, Agent, or Firm* — Wood Herron & Evans LLP

(57) ABSTRACT

An adaptor (166) for interfacing between an endpiece (38) of a lifting apparatus (30) and a nacelle (14) of a wind turbine (10). The adaptor (166) includes a base plate (174) having projections (204) configured to engage the adaptor (166) to the nacelle (14) and first and second side legs (176, 178) extending away from the base plate (174) opposite the projections (204) that define a recess (202) configured to engage the adaptor (166) with the endpiece (38) of the lifting apparatus (30). The adaptor (166) further includes first and second set screws (208, 210) positionable in bores (212) of the first and second side legs (176, 178) and movable to laterally adjust the position the adaptor (166) relative to the endpiece (38) of the lifting apparatus (30). This allows the lifting apparatus (30) to lift a nacelle assembly (24) having a laterally offset centre of gravity (158) in a balanced manner. A method for handling multiple wind turbine (10) components, including a nacelle (14), through selective use of the adaptor (166) is also disclosed.

25 Claims, 15 Drawing Sheets

(51) Int. Cl.
    *F03D 13/10* (2016.01)
    *F03D 13/40* (2016.01)
    *F03D 80/50* (2016.01)

(52) U.S. Cl.
    CPC ........... *F03D 13/40* (2016.05); *F03D 13/403* (2023.08); *F03D 80/50* (2016.05); *F05B 2230/61* (2013.01); *Y02E 10/72* (2013.01); *Y02P 70/50* (2015.11)

(58) Field of Classification Search
    CPC ...... F03D 80/50; F05B 2230/61; Y02E 10/72; Y02P 70/50
    See application file for complete search history.

(56) References Cited

U.S. PATENT DOCUMENTS 8,544,923 B2 * 10/2013 Inda .................... B66C 1/66
                                                   294/215
2010/0043227 A1    2/2010 Numajiri

FOREIGN PATENT DOCUMENTS

| EP | 2364949 A1 | 9/2011 |
| KR | 20150111415 A | 10/2015 |
| WO | 2011154110 A1 | 12/2011 |
| WO | 2019209103 A1 | 10/2019 |

* cited by examiner

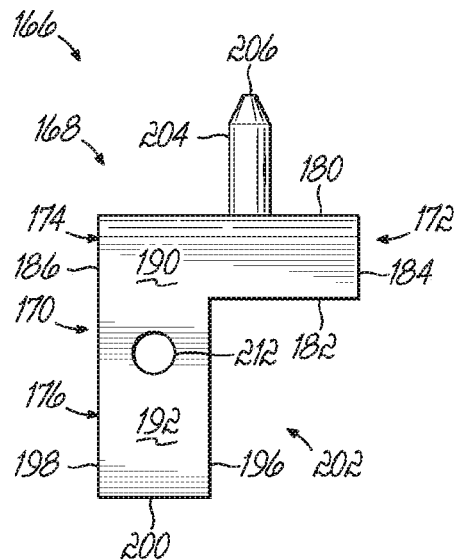
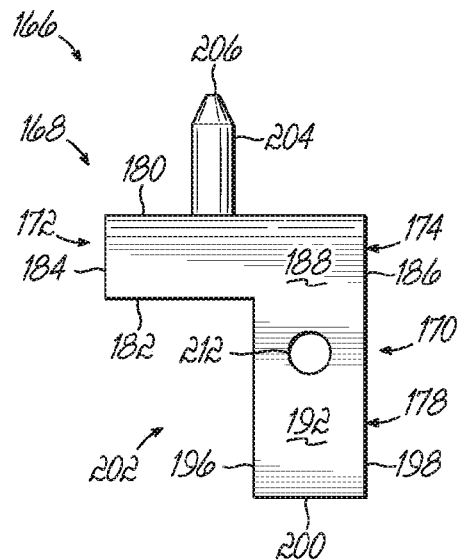
FIG. 8A
FIG. 8B
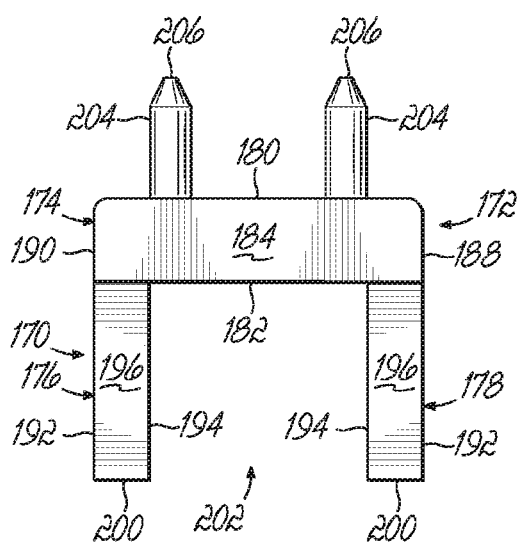
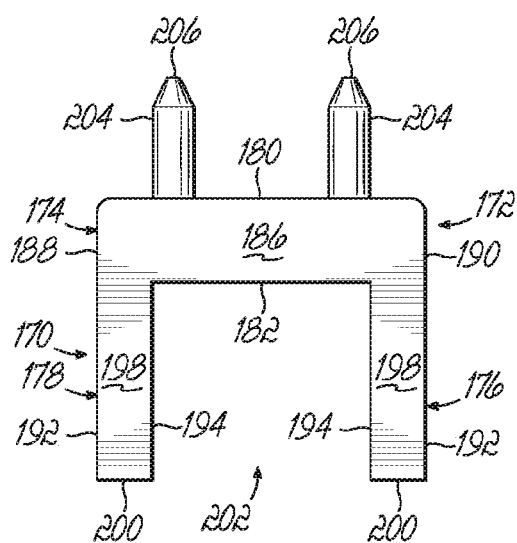
FIG. 8C
FIG. 8D

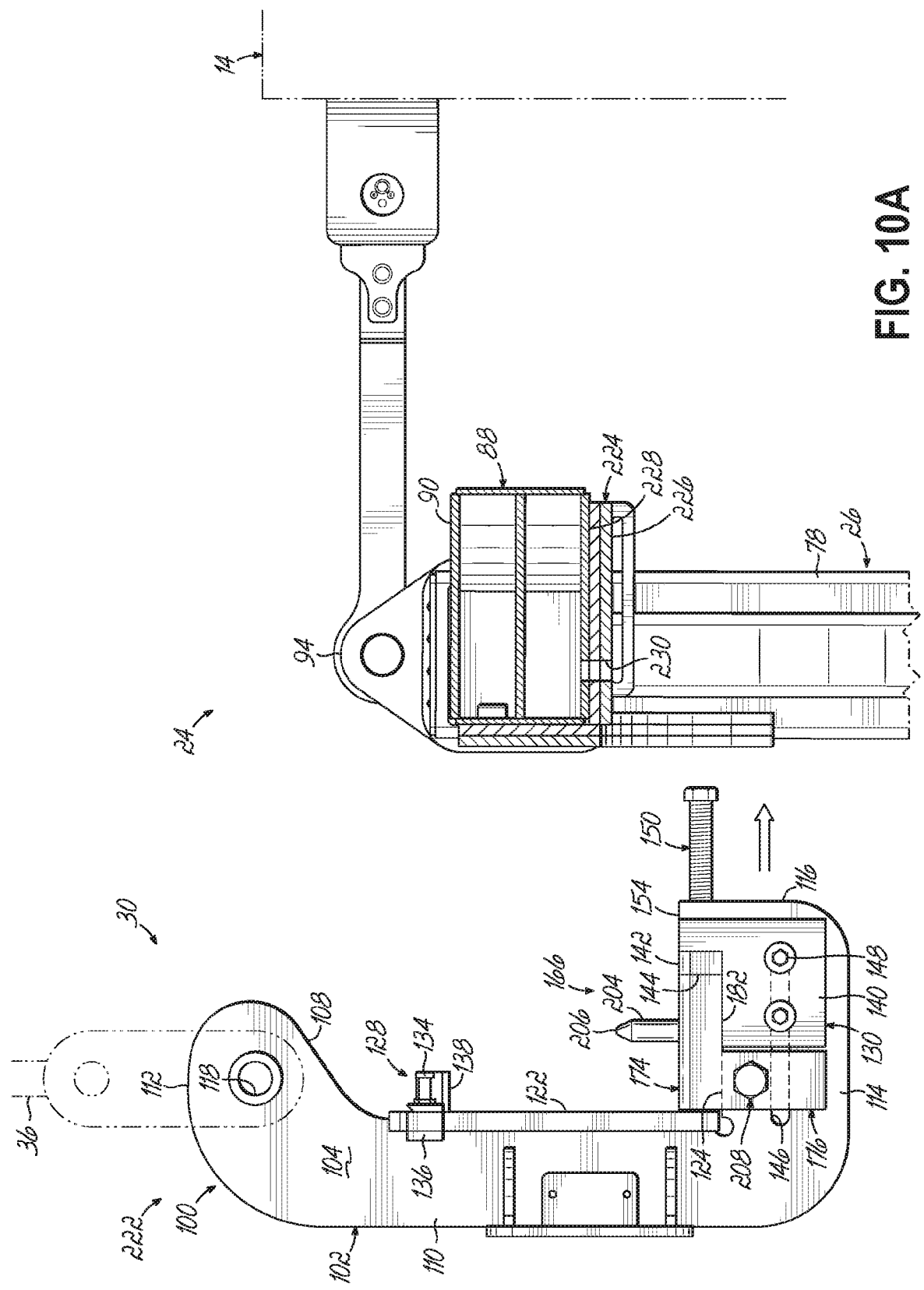

ADAPTOR FOR PROVIDING AN ADJUSTABLE CONNECTION BETWEEN AN ENDPIECE OF A LIFTING APPARATUS AND A NACELLE, AND METHOD OF USING SAME

TECHNICAL FIELD

This invention relates generally to wind turbines, and more particularly to an adaptor disposed between an endpiece of a lifting apparatus and a transport frame of a nacelle assembly that provides an improved, tool-less connection to the transport frame and is adjustable to accommodate lateral displacements of the centre of gravity of the nacelle assembly, and to a method of using the adaptor to hoist a nacelle assembly in a balanced manner using the lifting apparatus.

BACKGROUND

Wind turbine generators are used to produce electrical energy using a renewable resource and without combusting a fossil fuel. A wind turbine generator converts kinetic energy from the wind into electrical energy, and includes a tower, a nacelle mounted atop the tower, a rotor hub rotatably supported by the nacelle, and a plurality of rotor blades attached to the hub. The hub is coupled to a generator housed inside the nacelle. Consequently, as wind forces the blades to rotate, electrical energy is produced by the generator.

In a typical installation process, various components of the wind turbine, such as the nacelle, tower or tower sections, rotor hub, rotor blades, etc., are manufactured separately at one or more manufacturing facilities and then transported to an installation site for assembly. This process requires that the various components be loaded onto and unloaded from transportation means, which may include trucks, railroad cars, ships, and/or other suitable transportation vehicles. In this regard, the manufacturing facility or an intermediate loading facility (e.g., quayside for offshore wind turbines) may include various lifting apparatus for moving the wind turbine components around the facility and/or to their desired location on the transportation means.

By way of example, one or more cranes may be used at a facility or location to move the components about the facility or load/unload wind turbine components to/from a transportation vehicle. More particularly, a dual-crane system may be used to move tower sections at a facility or load/unload location. In this system, a first crane may connect to and hoist a first end of the tower section and a second crane may connect to and hoist a second end of the tower section. The first and second cranes may then coordinate their movements to move the tower section to a desired location. To lift the ends of the tower sections, the cranes include an endpiece that facilitates a coupling with the respective ends of the tower section. By way of example, the endpiece may be configured as a J-hook for attaching to the ends of the tower sections, as is generally known in the art.

In a dual-crane system, J-hooks are particularly well suited for lifting loads that have a regular geometry and a predictable centre of gravity. More particularly, the centre of gravity of a load being lifted by J-hooks in a dual-crane system should preferably be within a vertical geometrically-centered plane that includes the J-hooks. A lateral offset of the centre of gravity from this central plane will cause the load to tilt when it is lifted by the dual-crane system. Because tower sections have a regular geometry and a centre of gravity that generally lies along the geometric central plane of the tower section, J-hooks are extensively used for the crane endpiece when handling tower sections.

One or more cranes, such as a dual-crane arrangement, may also be used at a facility or handling location to move nacelles. Unlike tower sections, however, nacelles may have a centre of gravity that does not lie along a geometric central plane of the nacelles, and the J-hooks used to handle the tower sections are thought to be unsuitable to move the nacelles. Accordingly, technicians or other personnel at the facility or handling location must then switch out the crane endpieces and configure those endpieces to attach to the nacelle without damaging the nacelle. This switch out and connection process tends to be fairly complex and time-consuming to ensure a balanced lift of the nacelle with the crane(s) and without imposing undue stresses on the nacelle during the lift. Thus, the moving or loading/unloading process of wind turbine components with a crane arrangement is significantly slowed as a result of the cranes requiring different endpieces and/or connection means for handling different wind turbine components.

In view of the above, manufacturers seek improved designs for handling multiple wind turbine components at a facility, load/unload location, etc. using lifting apparatus, such as a dual-crane arrangement, that avoids the need for switch-out processes and complex connections to accommodate the different components. Moreover, solutions are sought that allow a crane endpiece to be used to move different wind turbine components even when the components' centre of gravity may be slightly laterally offset from a geometric central plane of the components. Furthermore, manufacturers seek improved methods for handling different wind turbine components when their centre of gravity may be slightly laterally offset from the geometric central plane of the components.

SUMMARY

An adaptor for interfacing between an endpiece of a lifting apparatus and a nacelle of a wind turbine includes a base plate having an outer surface and an inner surface, the outer surface having one or more projections configured to engage the adaptor to the nacelle; a first side leg extending away from the inner surface of the base plate, wherein the first side leg includes an outer surface, an inner surface, and a first bore extending between the inner and outer surfaces of the first side leg; a second side leg extending away from the inner surface of the base plate and spaced from the first side leg, wherein the second side leg includes an outer surface, an inner surface, and a second bore extending between the inner and outer surfaces of the second side leg. The base plate, first side leg, and second side leg collectively define a recess configured to engage the adaptor with the endpiece of the lifting apparatus. The adaptor further includes a first set screw positionable in the first bore such that an abutment end of the first set screw is disposed within the recess, and a second set screw positionable in the second bore such that an abutment end of the second set screw is disposed within the recess. The first and second set screws are configured to be movable, relative to the first and second bores, respectively, toward and away from each other to adjustably position the adaptor relative to the endpiece of the lifting apparatus.

In one embodiment, the base plate is generally rectangular and may further include a front surface, a rear surface, and opposed side surfaces, wherein the first and second side legs extend from the inner surface adjacent respective side surfaces of the base plate. Additionally, the first and second side legs may extend from the inner surface adjacent to the rear surface of the base plate. Furthermore, the first and second side legs may have a length that is less than a length of the base plate. Moreover, in an exemplary embodiment, the first and second side legs may be aligned across a width of the base plate. Still further, the first and second side legs may extend from the inner surface of the base plate at a substantially right angle.

In one embodiment, the first and second set screws and the first and second bores may be threaded such that rotation of the set screws moves the first and second set screws toward and away from each other. The first bore and the second bore may extend through their respective side legs in a direction substantially parallel to the base plate. Additionally, the first bore and the second bore may extend through their respective side legs adjacent the inner surface of the base plate. In one embodiment, the first and second set screws are movable toward and away from each other along an axis, and the adaptor is configured to be adjustable relative to the endpiece of the lifting apparatus in a direction substantially parallel to the axis.

In an exemplary embodiment, the one or more projections may include a plurality of posts aligned and spaced apart on the upper surface of the base plate, wherein each of the plurality of posts has a tapered end. Furthermore, the adaptor may be configured to mount to the nacelle in a tool-less manner. In an exemplary embodiment, the endpiece includes a J-hook and the nacelle includes a transport frame, wherein the adaptor is configured to be disposed between the J-hook and the transport frame attached to the nacelle.

In another embodiment, an endpiece assembly for a lifting apparatus having a lifting cable includes an endpiece configured to be coupled to the lifting cable of the lifting apparatus. The endpiece defines a lateral direction and the adaptor, as described above, mounted to the endpiece. The position of the adaptor relative to the endpiece is adjustable in the lateral direction and is coupled to the endpiece at least by the first and second set screws. In an exemplary embodiment, the endpiece may be a J-hook. The J-hook may further include a first leg having an eyelet for attaching to the lifting cable of the lifting apparatus and a first edge, and a second leg extending from the first leg and having a second edge. The adaptor is mounted on the second edge such that the inner surface of the base plate engages the second edge and the second leg of the J-hook is disposed in the recess between first and second side legs of the adaptor. In one embodiment, the distance between the inner surfaces of the first and second side legs of the adaptor is greater than a thickness of the second leg of the J-hook to allow for adjustability of the adaptor in the lateral direction. The J-hook may additionally include a lock jaw for further securing the adaptor to the J-hook.

In a further embodiment, a method of handling wind turbine components at a facility includes providing a lifting apparatus having a lifting cable and an endpiece on the lifting cable configured to interface with a load for lifting with the lifting apparatus. The method includes providing a first wind turbine component for moving with the lifting apparatus, the first wind turbine component having a centre of gravity laterally offset from a central plane of the first wind turbine component; selectively disposing an adaptor between the endpiece of the lifting apparatus and the first wind turbine component, the adaptor being adjustable relative to the endpiece of the lifting apparatus in a lateral direction; positioning the adaptor relative to the endpiece of the lifting apparatus so that the endpiece is vertically aligned with the offset centre of gravity of the first wind turbine component; and lifting the first wind turbine component with the lifting apparatus.

In one embodiment, the adaptor between the endpiece of the lifting apparatus and the first wind turbine component includes attaching the adaptor to the endpiece of the lifting apparatus to form an endpiece assembly and subsequently attaching the endpiece assembly to the first wind turbine component. In an exemplary embodiment, the attachment of the endpiece assembly to the first wind turbine component may be tool-less.

In one embodiment, positioning the adaptor relative to the endpiece of the lifting apparatus may include predetermining the lateral offset of the centre of gravity of the first wind turbine component and, prior to lifting the first wind turbine component, adjusting the position of the adaptor relative to the endpiece of the lifting apparatus to correspond to the predetermined lateral offset. Additionally or alternatively, positioning the adaptor relative to the endpiece of the lifting apparatus may include iteratively adjusting the position of the adaptor relative to the endpiece of the lifting apparatus and lifting the first wind turbine component with the lifting apparatus until the first wind turbine component fails to tilt when lifted by the lifting apparatus.

In still a further embodiment, the method may include using the endpiece of the lifting apparatus without the adaptor to lift a second wind turbine component at the facility. In this way, the endpiece of the lifting apparatus may be used to handle two different wind turbine components at the facility without having to change out the endpiece of the lifting apparatus. Instead, the adaptor merely has to be inserted or removed in order to use the endpiece for the different wind turbine components.

In one embodiment, the first wind turbine component may include a nacelle assembly including a nacelle having a front end and a rear end, a first transport frame attached to the front end of the nacelle, and a second transport frame attached to the rear end of the nacelle. The nacelle assembly has a laterally offset centre of gravity relative to its central plane. In one embodiment, the second wind turbine component may include a tower section, where the centre of gravity is generally along the central plane of the tower section.

In one embodiment, the lifting apparatus includes a dual-crane system having a first crane with a first lifting cable and a first endpiece and a second crane with a second lifting cable and a second endpiece. In this case, the method may include selectively disposing a first adaptor between the first endpiece and the first transport frame of the nacelle assembly; positioning the first adaptor relative to the first endpiece of the lifting apparatus so that the first endpiece is vertically aligned with the offset centre of gravity of the nacelle assembly; selectively disposing a second adaptor between the second endpiece and the second transport frame of the nacelle assembly; positioning the second adaptor relative to the second endpiece of the lifting apparatus so that the second endpiece is vertically aligned with the offset centre of gravity of the nacelle assembly; and lifting the nacelle assembly with the dual crane system.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIGS. 8A and 8B are side views of the adaptor illustrated in FIG. 8;

FIGS. 8C and 8D are front and rear elevation views of the adaptor illustrated in FIG. 8;

FIGS. 10A and 10B are schematic illustrations of connecting the J-hook assembly shown in FIG. 9 to a transport frame of a nacelle assembly;

DETAILED DESCRIPTION

Figure 1:
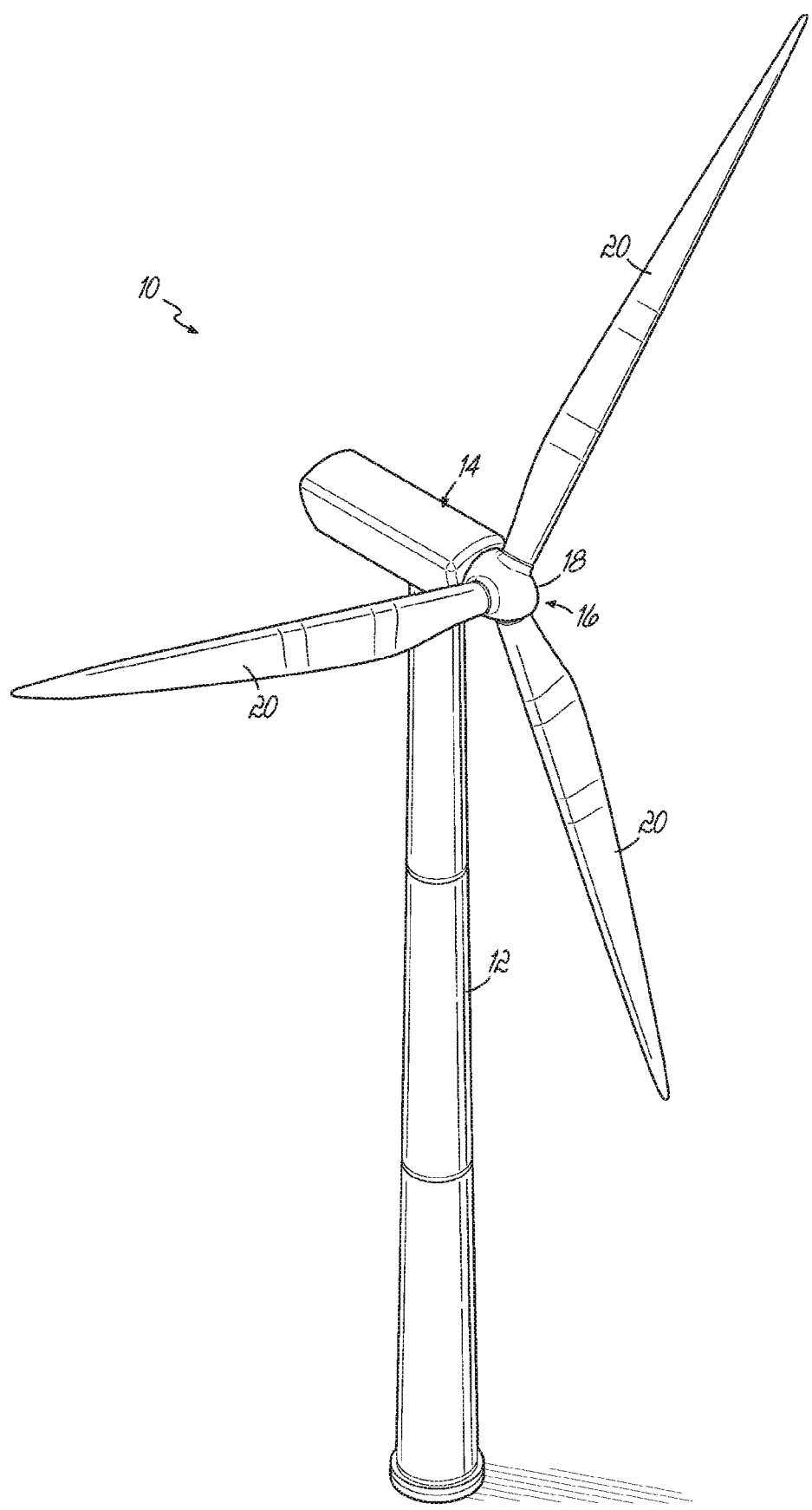
FIG. 1 is a front perspective view of a wind turbine.

With reference to FIG. 1, a wind turbine 10 includes a tower 12, a nacelle 14 disposed at the apex of the tower 12, and a rotor 16 operatively coupled to a generator (not shown) via a gearbox (not shown) housed inside the nacelle 14. In addition to the generator and gearbox, the nacelle 14 may house various components needed to convert wind energy into electrical energy and to operate and optimize the performance of the wind turbine 10. The tower 12 supports the load presented by the nacelle 14, rotor 16, and other wind turbine components housed inside the nacelle 14 and operates to elevate the nacelle 14 and rotor 16 to a height above ground level or sea level, as may be the case, at which air currents having lower turbulence and higher velocity are typically found.

The rotor 16 may include a central hub 18 and a plurality of blades 20 attached to the central hub 18 at locations distributed about the circumference of the central hub 18. In the representative embodiment, the rotor 16 includes three blades 20, however the number may vary. The blades 20, which project radially outward from the central hub 18, are configured to interact with passing air currents to produce rotational forces that cause the rotor 16 to spin about its longitudinal axis. The design, construction, and operation of the blades 20 are familiar to a person having ordinary skill in the art of wind turbine design and may include additional functional aspects to optimize performance. For example, pitch angle control of the blades 20 may be implemented by a pitch control mechanism (not shown) responsive to wind velocity to optimize power production in low wind conditions, and to feather the blades if wind velocity exceeds design limitations. Wind exceeding a minimum level may activate the rotor 16, causing the rotor 16 to rotate in a direction substantially perpendicular to the wind, applying torque to the input shaft of the generator. The electrical power produced by the generator may be supplied to a power grid (not shown) or an energy storage system (not shown) for later release to the grid as understood by a person having ordinary skill in the art. In this way, the kinetic energy of the wind may be harnessed by the wind turbine 10 for power generation.

Figure 2:
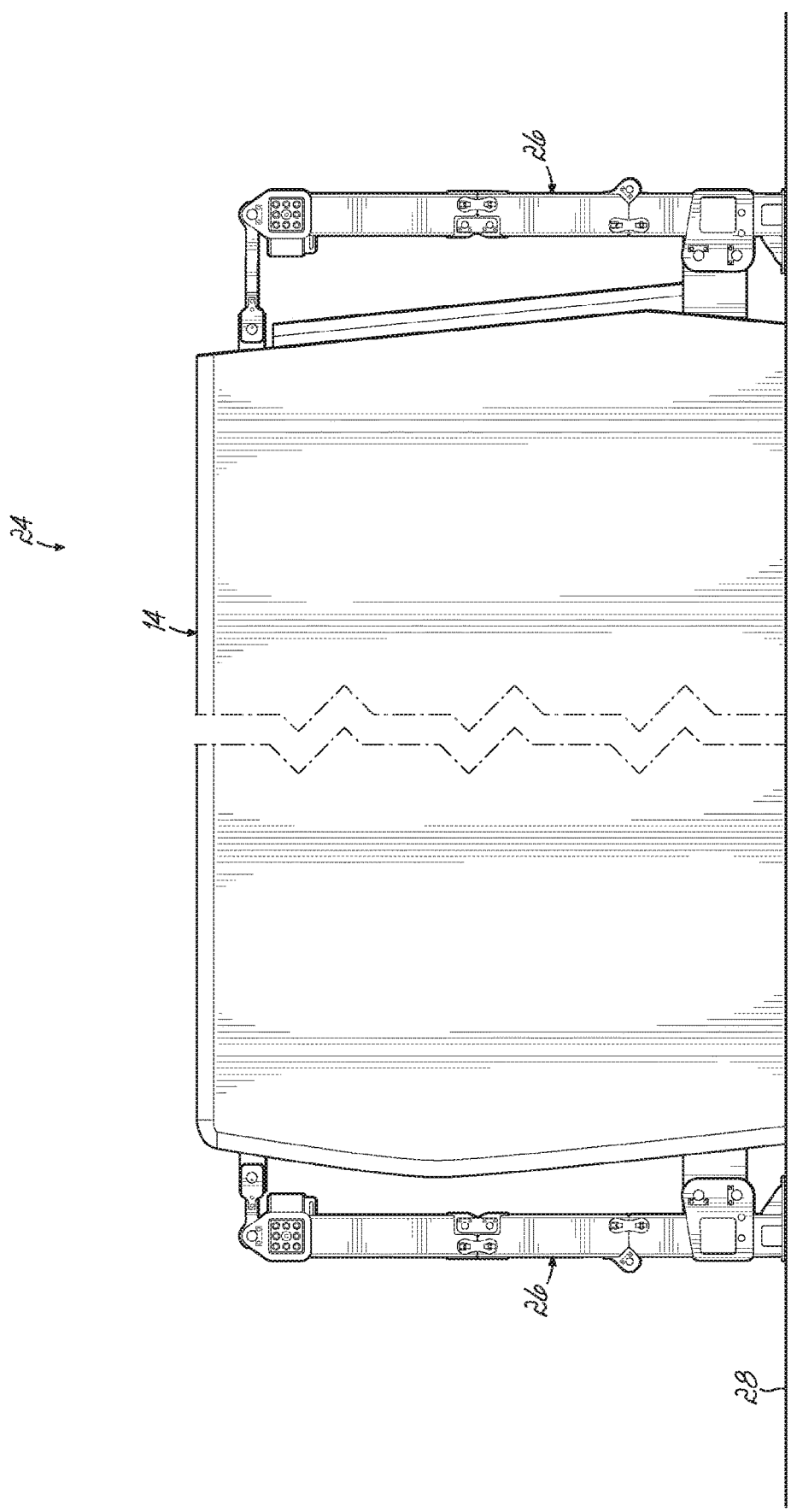
FIG. 2 is a side elevation view of a nacelle assembly including a nacelle with transport frames on opposed ends.

FIG. 2 illustrates a nacelle assembly 24 in accordance with an embodiment of the invention. The nacelle assembly 24 includes the nacelle 14 and a pair of transport frames 26 attached to front and rear ends of the nacelle 14. The transport frames 26 are configured to facilitate the handling of a nacelle 14 for various purposes. For example, the transport frames 26 may aid in handling the nacelle 14 during manufacturing and/or storage of a nacelle 14 at a manufacturing facility. The transport frames 26 may also be used during the transport of a nacelle 14 from the manufacturing site to the installation site. In many instances, the transport frames 26 are attached to the nacelle 14 during manufacturing or shortly thereafter. In this way, the storage and/or handling of nacelles 14 at particular locations are often done in the context of the nacelle assembly 24, as opposed to only the nacelle 14. FIG. 2, for example, illustrates the nacelle assembly 24 positioned on a support surface 28 at a handling location during storage, for example. The support surface 28 may be the ground, one or more stands/frames that raise the nacelle assembly 24 off the ground, or other support surface. The handling location may be at the manufacturing facility, a loading facility, unloading facility, or any other type of intermediate or end-point facility in the chain from the manufacturing facility to the installation site where the handling of the nacelle 14 may be necessary.

Figure 3:
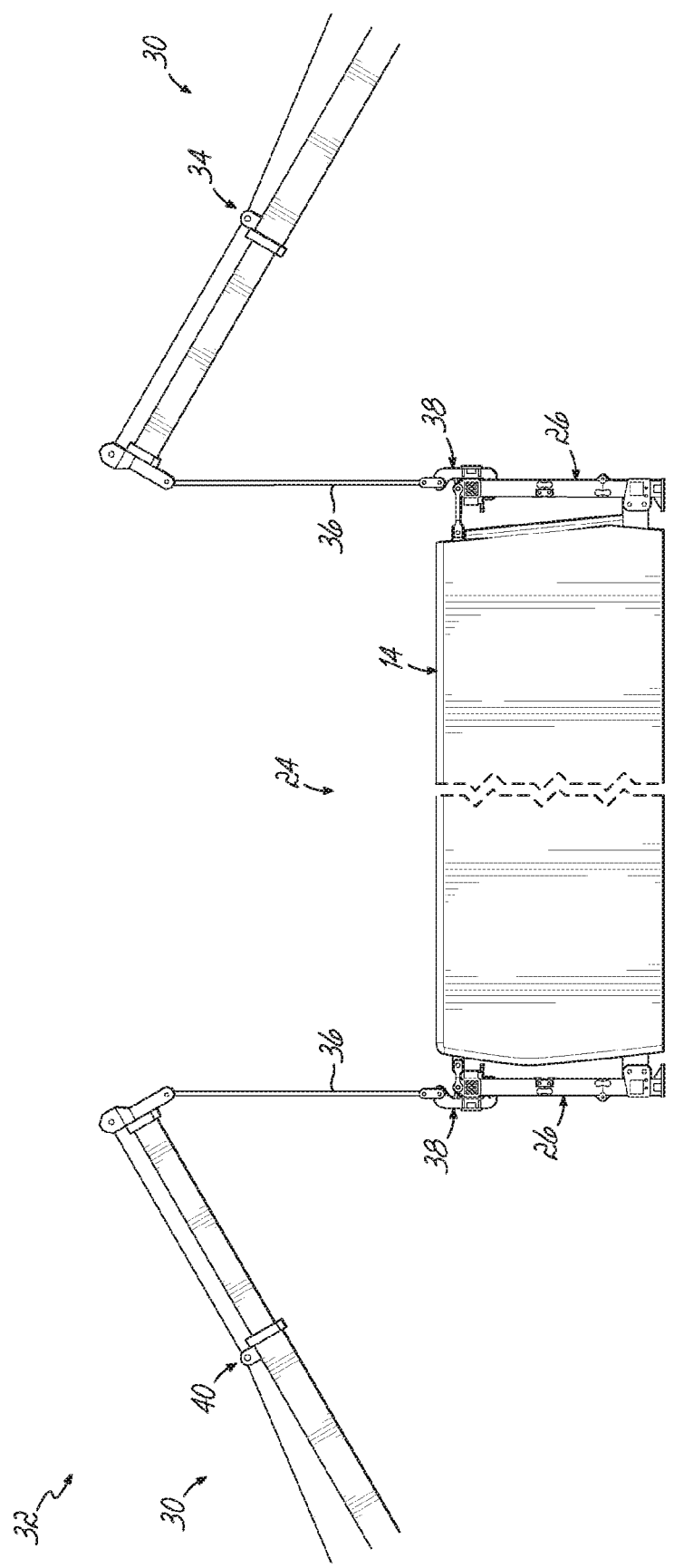
FIG. 3 is a side elevation view of a nacelle assembly being lifted by a lifting apparatus configured as a dual-crane system.

At the various handling locations, it may be necessary to move the nacelle 14 from one place to another. To this end, handling locations typically include one or more lifting apparatus 30 for hoisting the nacelle 14 off the support surface 28 and moving the nacelle 14 to another location. FIG. 3 illustrates an exemplary embodiment where the lifting apparatus 30 is configured as a dual-crane arrangement 32. The dual-crane arrangement 32 includes a first crane 34 having a lifting cable 36 and a cable endpiece 38 configured to be attached to a front end of the nacelle 14, and a second crane 40 having a lifting cable 36 and a cable endpiece 38 configured to be attached to a rear end of the nacelle 14. In one aspect of the invention, and as will be discussed in more detail below, the endpieces 38 of the lifting cables 36 of the cranes 34, 40 are configured to be attached to the transport frames 26 at the front and rear ends of the nacelle 14. Connecting the lifting cables 36 to the transport frames 26 as opposed to the nacelle 14 itself, minimizes the risk of damaging the nacelle 14 during the movement of the nacelle 14 using the dual-crane arrangement 32.

In any event, the two cranes 34, 40 may then be moved in a coordinated manner to move the nacelle assembly 24 from a first position or location to a second position or location at the handling location as known to those of ordinary skill in the art. While the lifting apparatus 30 illustrated in the figures includes a pair of cranes 34, 40, it should be understood that the lifting apparatus 30 may take a wide range of forms, including various mobile or stationary cranes, various permanent or temporary cranes, as well as various arrangements of winches, drums, lifting cables, booms, counterweights, etc. that typically accompany lifting apparatus. Accordingly, the lifting apparatus should not be limited to any particular type or arrangement so long as the lifting apparatus has a lifting cable, an endpiece on the lifting cable, and the capability to hoist the load attached to the endpiece and move the load to another location.

Figure 4:
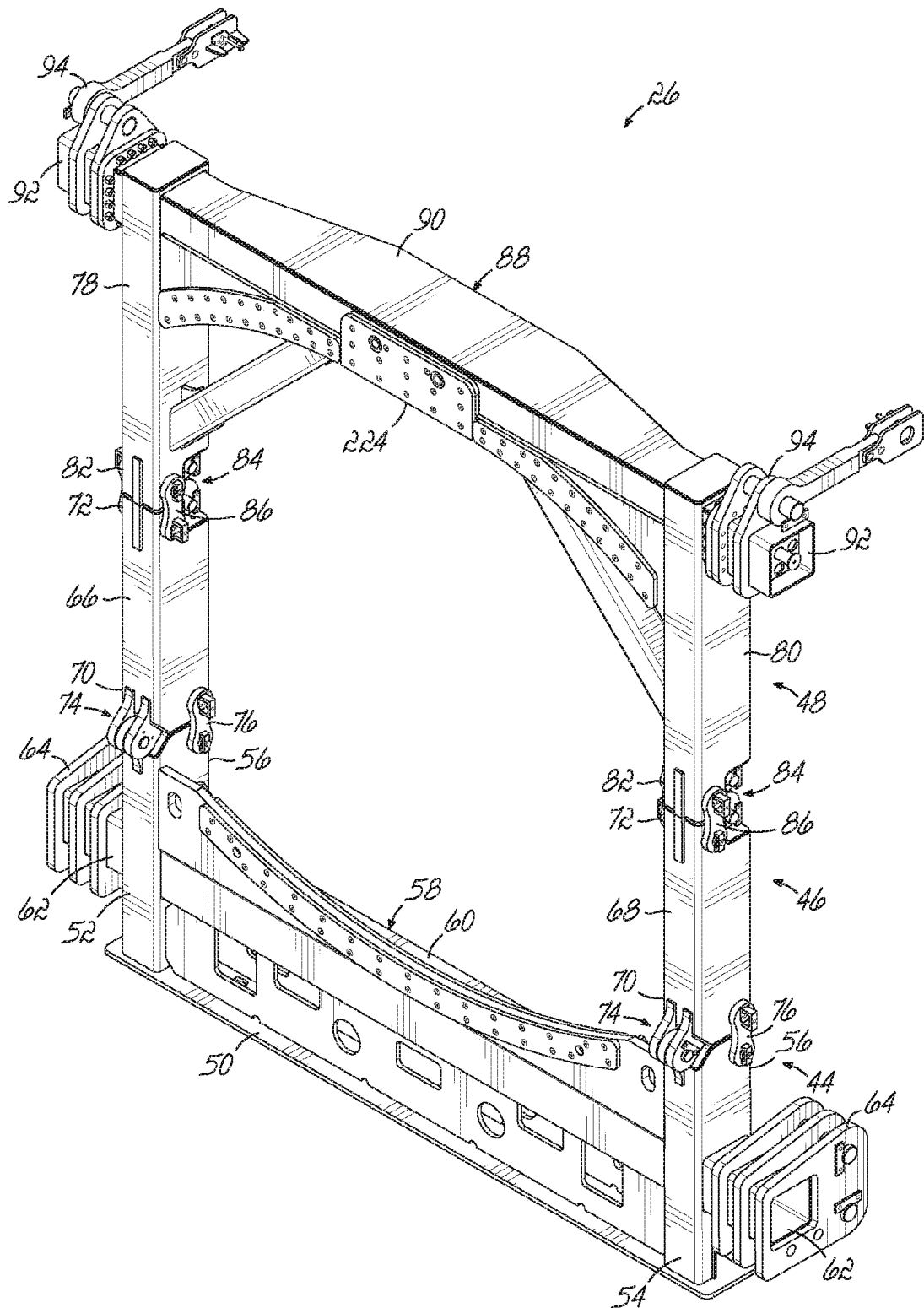
FIG. 4 is a front perspective view of a transport frame.
Figure 5:
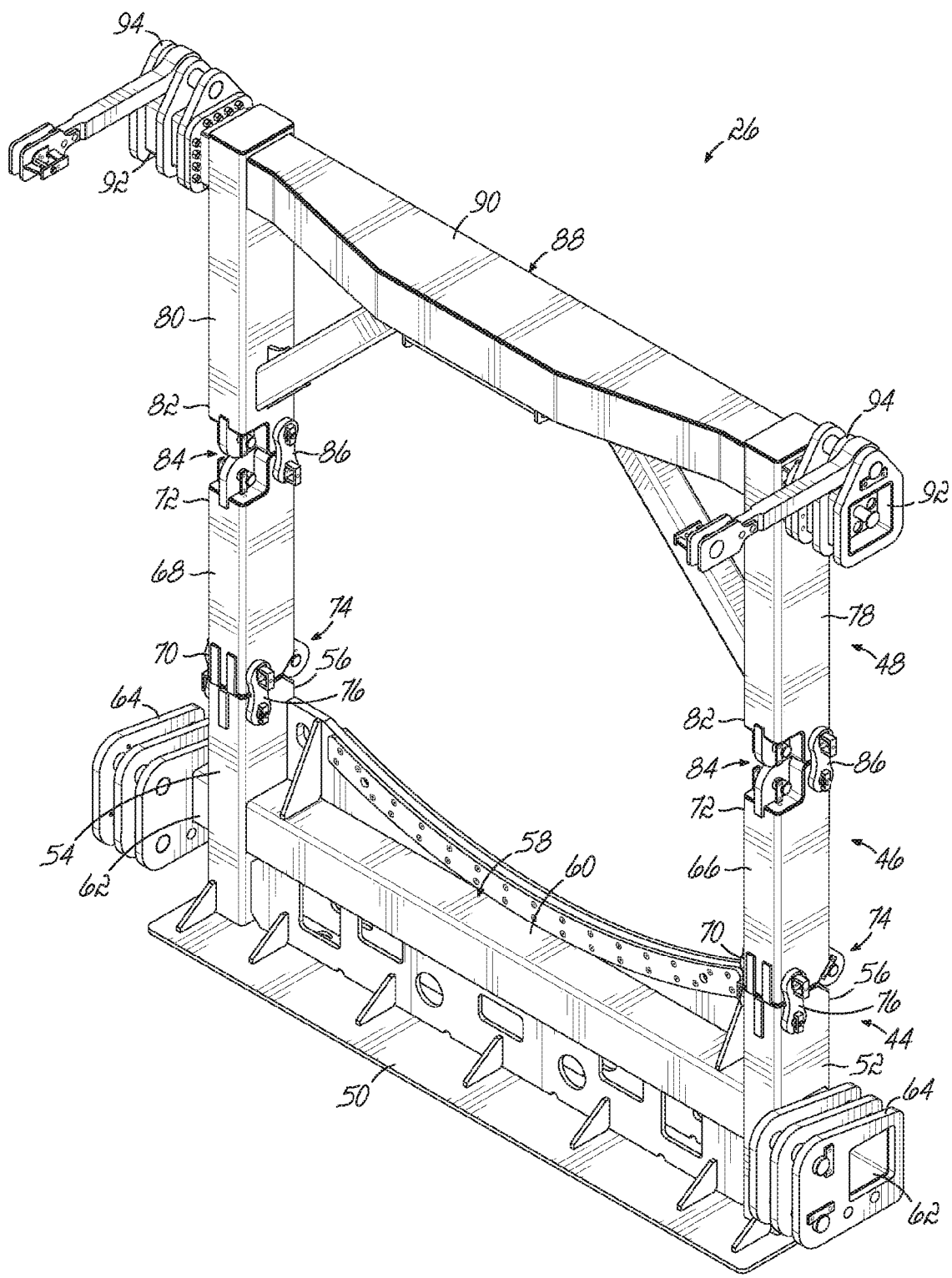
FIG. 5 is a rear perspective view of the transport frame shown in FIG. 4.

A transport frame 26 in accordance with an embodiment of the invention is shown in FIGS. 4 and 5 and is configured to connect to the front and rear ends of the nacelle 14. The front and rear transport frames 26 are nearly identical to each other. Accordingly, only one transport frame 26 will be described in detail. It should be understood, however, that the other transport frame 26 has a similar construction and description. While some details of the transport frames 26 are provided below, additional details of the transport frames may be found in Applicant's application PCT/DK2020/050388. As illustrated in FIGS. 4 and 5, the transport frame 26 has a multi-sectional design including a bottom frame section 44, an intermediate frame section 46, and a top frame section 48 coupled to each other to form the transport frame 26.

The bottom frame section 44 includes a base support 50, which in an exemplary embodiment may take the form of a generally rectangular base plate, configured to support the transport frame 26 on the support surface 28. Two generally vertical and spaced apart main beams 52, 54 extend from an upper surface of the base support 50 with each terminating at an upper connecting end 56. The base support 50 further includes a lower cross beam 58 that extends between and beyond the main beams 52, 54 and which is generally parallel to the base support 50. In one embodiment, the lower cross beam 58 may be a monolithic beam section that extends through openings formed in the main beams 52, 54 and is welded or otherwise secured to the main beams 52, 54. The lower cross beam 58 includes an inboard cross beam section 60 between the two main beams 52, 54 and a pair of outboard cross beam sections 62 on the outside of the main beams 52, 54. The outboard cross beam sections 62 of the cross beam 50 include lower nacelle mounts 64 configured to connect to lower nacelle tangs on the nacelle 14.

The intermediate frame section 46 includes two generally vertical and spaced apart main beams 66, 68 with each terminating at a lower connecting end 70 and an upper connecting end 72. The lower connecting ends 70 of the main beams 66, 68 are configured to be coupled to the upper connecting ends 56 of the main beams 52, 54 of the bottom frame section 44. The main beams 66, 68 of the intermediate frame section 46 may be coupled to the main beams 52, 54 of the bottom frame section 44 by a hinged connection 74 that allows relative rotational movement between the intermediate frame section 46 and the bottom frame section 44. The hinged connection 74 may further include one or more selectively engageable locks 76.

The top frame section 48 includes two generally vertical and spaced apart main beams 78, 80 with each terminating at a lower connecting end 82. The lower connecting ends 82 of the main beams 78, 80 are configured to be coupled to the upper connecting ends 72 of the main beams 66, 68 of the intermediate frame section 46. The main beams 78, 80 of the top frame section 48 may be coupled to the main beams 66, 68 of the intermediate frame section 46 by a hinged connection 84 that allows relative rotational movement between the top frame section 48 and the intermediate frame section 46. The hinged connection 84 may further include one or more selectively engageable locks 86.

The top frame section 48 further includes an upper cross beam 88 that extends between and beyond the main beams 78, 80 and which is generally parallel to the base support 50 and lower cross beam 58. In one embodiment, the upper cross beam 88 may be a monolithic beam section that extends through openings formed in the main beams 78, 80 and are welded or otherwise secured to the main beams 78, 80. The upper cross beam 88 includes an inboard cross beam section 90 between the two main beams 78, 80 and a pair of outboard cross beam sections 92 on the outside of the main beams 78, 80. The outboard cross beam sections 92 of the upper cross beam 88 includes upper nacelle mounts 94 configured to connect to upper nacelle tangs on the nacelle 14.

As illustrated in FIG. 3, the endpieces 38 of the lifting cables 36 on the cranes 34, 40 are configured to engage with transport frames 26 at the front and rear ends of the nacelle 14. In accordance with one aspect of the invention, the endpieces 38 of the cranes 34, 40 are configured to interface with multiple wind turbine components being hoisted by the lifting apparatus 30. As mentioned above, to hoist tower sections using the lifting apparatus 30, the endpieces 38 may be configured as J-hooks. As previously noted, the challenge is to then use the J-hooks to also interface with the transport frames attached to the front and rear ends of the nacelle in a manner that avoids the balance and centre of gravity concerns that have limited the use of J-hooks for nacelle handling in the past. As discussed in more detail below, the inventor has discovered a solution for overcoming the balance and centre of gravity issues associated with using J-hooks to hoist nacelles. More particularly, the inventor has developed an adaptor that may be disposed between the J-hook and a transport frame that provides lateral adjustability in order to accommodate displacements of the centre of gravity of the nacelle assembly away from the geometric central plane between the two J-hooks coupled to the nacelle assembly. By providing this lateral adjustability, the nacelle assembly may be hoisted by the lifting apparatus in a balanced manner (i.e., without the nacelle tilting to one side or the other when lifted off the support surface.

Figure 6:
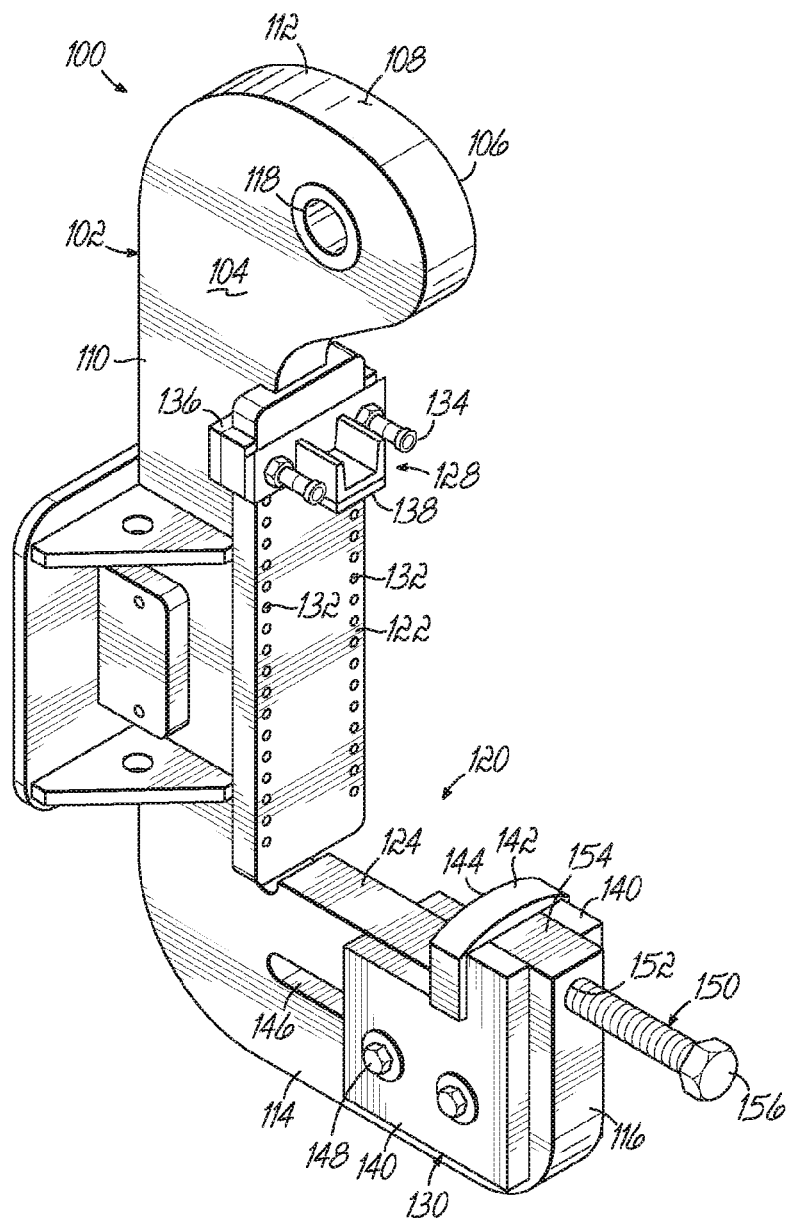
FIG. 6 is a perspective view of an endpiece for a lifting apparatus configured as a J-hook.

FIG. 6 illustrates an exemplary J-hook 100 that may be used according to aspects of the present invention. The J-hook 100 includes a plate-like body 102 defining opposed first and second surfaces or faces 104, 106 and a sidewall 108 extending between the two faces 104, 106. The body 102 is generally J-shaped with a first leg 110 having upper end 112 and a second leg 114 extending from a lower end of the first leg 110, such as at about 90 degrees, and terminating at an outer end 116. The upper end 112 of the J-hook 100 includes a cable eyelet 118 for attaching to the lifting cable 36 of the lifting apparatus 30. The J-hook 100 includes a mouth 120 for receiving a portion of the wind turbine component being hoisted by the lifting apparatus 30. The mouth 120 may be defined at least in part by an L-shaped interface having a first interface portion or ridge and a second interface portion or ridge. In an exemplary embodiment, the first ridge may be formed at an inner edge of the first leg 110 and the second ridge may be formed at an upper edge of the second leg 114. The first ridge may further include a first engagement plate 122 attached to, for example, the inner edge of the first leg 110. The second ridge may similarly include a second engagement plate 124 attached to, for example, the upper edge of the second leg 114. In an alternative embodiment, the second engagement plate 124 may be omitted.

To secure the J-hook 100 to the wind turbine component being hoisted by the lifting apparatus 30, such as a tower section or the nacelle assembly 24, the J-hook includes a first lock jaw 128 configured to be releasably engaged with the first engagement plate 122 of the J-hook 100 and a second lock jaw 130 configured to be releasably engaged with the second engagement plate 124. In an exemplary embodiment, the first engagement plate 122 may include a plurality of bores 132 arranged in two columns, for example, in the first engagement plate 122 and configured to receive fasteners 134 for fixedly attaching the first lock jaw 128 at a selected position along the first engagement plate 122. The fasteners 134 may be threaded fasteners for being received in threaded bores 132, or lock pins received in the bores 132. The position of the first lock jaw 128 along the first engagement plate 122 will depend on how the wind turbine component is received within the mouth 120 of the J-hook 100. In any event, in one embodiment, the first lock jaw 128 includes a U-shaped bracket body 136 configured to be slidably engaged with the first engagement plate 122 (such as over the upper end of the plate 122) and a bearing surface 138 configured to engage with the wind turbine component being hoisted by the lifting apparatus 30.

In an exemplary embodiment, the second lock jaw 130 includes an L-shaped jaw body formed by a pair of spaced apart L-shaped plates 140 connected by a bearing pad 142 that defines a bearing surface 144. The second lock jaw 130 is configured to be slidably attached to the J-hook 100. In this regard, the second lock jaw 130 fits down over the upper edge of the second leg 114 such that the plates 140 of the second lock jaw 130 are disposed on the outside of the first and second faces 104, 106 of the hook body 102 and a bottom edge of the bearing pad 142 engages the second engagement plate 124. To slidably couple the second lock jaw 130 to the hook body 102, the second leg 114 includes an elongate slot 146 and the plates 140 of the second lock jaw 130 include one or more aligned apertures (two shown). One or more slide pins 148 are inserted into the one or more aligned apertures so as to extend through the elongate slot 146. This arrangement secures the second lock jaw 130 to the hook body 102 but allows the lock jaw 130 to slide along the second engagement plate 124. In this way, the second lock jaw 130 may be adjusted so as to engage with the wind turbine component being hoisted by the lifting apparatus 30, such as at bearing surface 144. To maintain the second lock jaw 130 in engagement with the wind turbine component, the J-hook 100 may include a threaded set screw 150 configured to be received within a threaded bore 152 in a lip 154 at the outer end 116 of the second leg 114 of the hook body 102. The set screw 150 has an abutment end (not shown) configured to engage the rear surface of the bearing pad 142 to effectively clamp the wind turbine component to the J-hook 100. The set screw 150 further includes a head 156 for turning the set screw 150, thereby adjusting the clamping pressure on the wind turbine component.

Figure 7A:
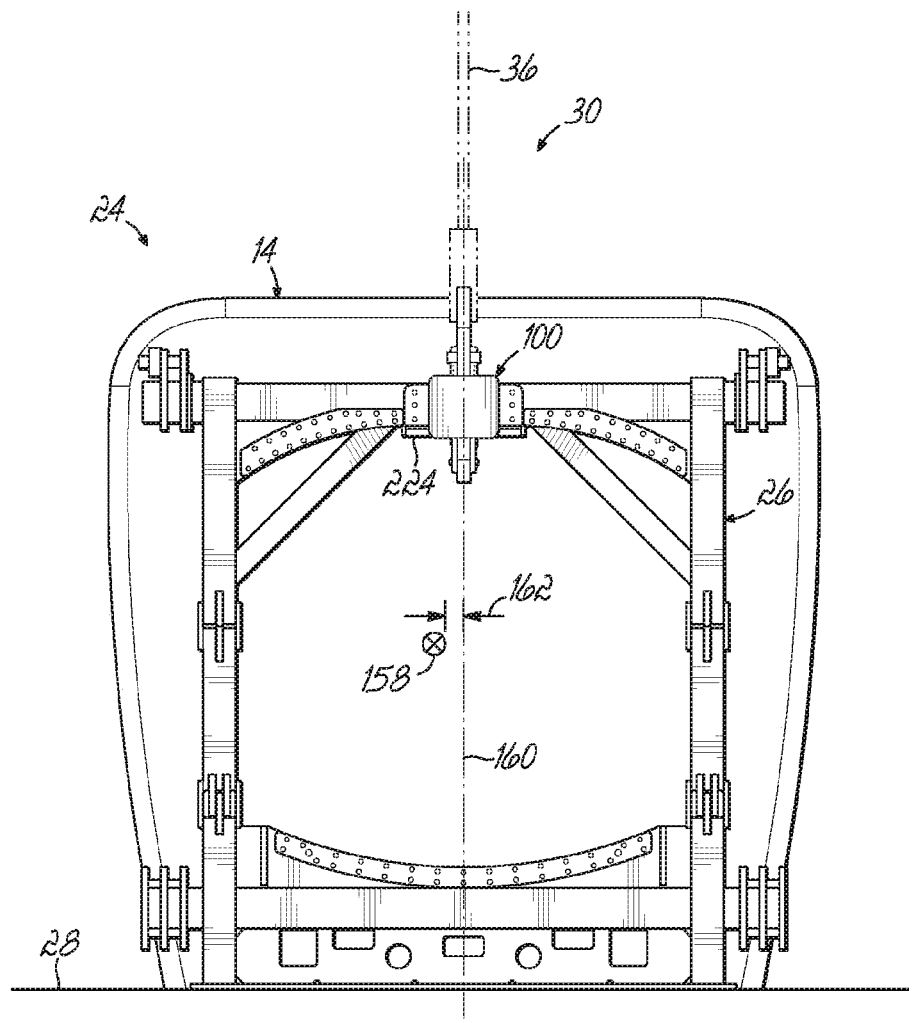
FIGS. 7A and 7B are schematic illustrations of lifting a nacelle assembly with a laterally offset centre of gravity with J-hooks.
Figure 7B:
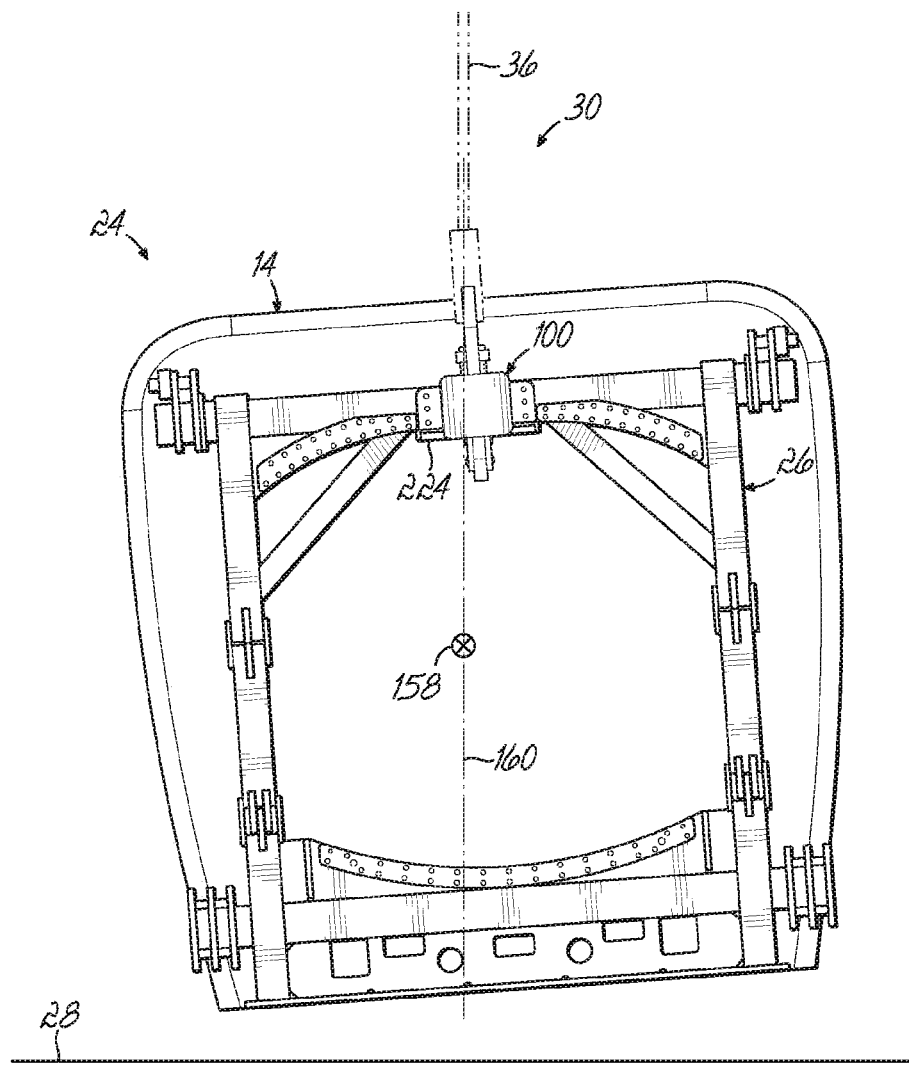

FIGS. 7A and 7B schematically illustrate the hoisting of a nacelle assembly 24 using current J-hooks, such as J-hooks 100 described above. As noted above, in many cases the centre of gravity 158 of the nacelle assembly 24 does not lie within the geometric central plane 160, where, for example, the J-hooks 100 typically attach to the transport frames 26, and along which the lifting cables 36 extend (see FIG. 7A). Instead, the centre of gravity 158 may be laterally displaced by an offset 162 from the geometric central plane 160 to one side thereof. Accordingly, when the nacelle assembly 24 is hoisted by the lifting apparatus 30, e.g., the two cranes 34, 40 of the dual crane arrangement 32, the nacelle assembly 24 tilts under the influence of gravity until the centre of gravity 158 lies vertically below the J-hooks 100 and aligns with the lifting cables 36, as schematically illustrated in FIG. 7B. Manufacturers and other technicians that handle wind turbine components want to avoid such an imbalance in the load hoisted by the lifting apparatus 30. Accordingly and as discussed above, the use of J-hooks 100 as the endpiece 38 of the lifting cables 36 is typically avoided when handling nacelles 16 or nacelle assemblies 24, and a change-out procedure is necessary to provide a more suitable endpiece 38 to the lifting apparatus 30 for handling nacelles 14.

In accordance with an aspect of the invention, to address this deficiency, an adaptor 166 may be disposed between the J-hook 100 of the lifting apparatus 30 and the transport frame 26 of the nacelle assembly 24 that allows the centre of gravity 158 of the nacelle assembly 24 to be shifted laterally so that the centre of gravity 158 is vertically aligned with the eyelet 118 of the J-hook 100 (and more particularly the lifting cable 36 attached to the eyelet 118). By providing this ability to adjust the lateral position of the nacelle assembly 24 relative to the J-hook 100, when the nacelle assembly 24 is lifted by the lifting apparatus 30, tilting of the nacelle assembly 24 is avoided and a balanced movement of the nacelle assembly 24 from one position to another using the lifting apparatus 30 may be achieved. Accordingly, the J-hooks 100, which are traditionally used to move tower sections, may also be used to move nacelle assemblies 24 at a handling location with the addition of adaptors 166 to the J-hooks 100. As explained in more detail below, the addition of the adaptors 166 to the J-hooks 100 is a relatively easy and quick step. Accordingly, the change-out processes currently used for handling multiple wind turbine components is avoided and moving wind turbine components at a handling location becomes more manageable and time efficient.

In one embodiment, and as described below, the adaptor 166 may be configured to be coupled to the J-hook 100, thereby forming a J-hook assembly that is then subsequently coupled to the transport frames 26 of the nacelle assembly 24. In other words, the adaptor 166 essentially becomes a part of the J-hook 100 for use with handling the nacelle assembly 24. However, in an alternative embodiment, the adaptor 166 may be configured to be coupled to the transport frames 26, thereby forming transport frame assemblies that are subsequently coupled to traditional types of J-hooks 100, such as that shown in FIG. 6. In either embodiment, the adaptor 166 is disposed between the J-hook 100 and the transport frames 26 to provide lateral adjustments of the nacelle assembly 24 to vertically align the offset centre of gravity 158 of the nacelle assembly 24 with the eyelet 118 of the J-hook 100 and the lifting cable 36 of the lifting apparatus 30.

Figure 8:
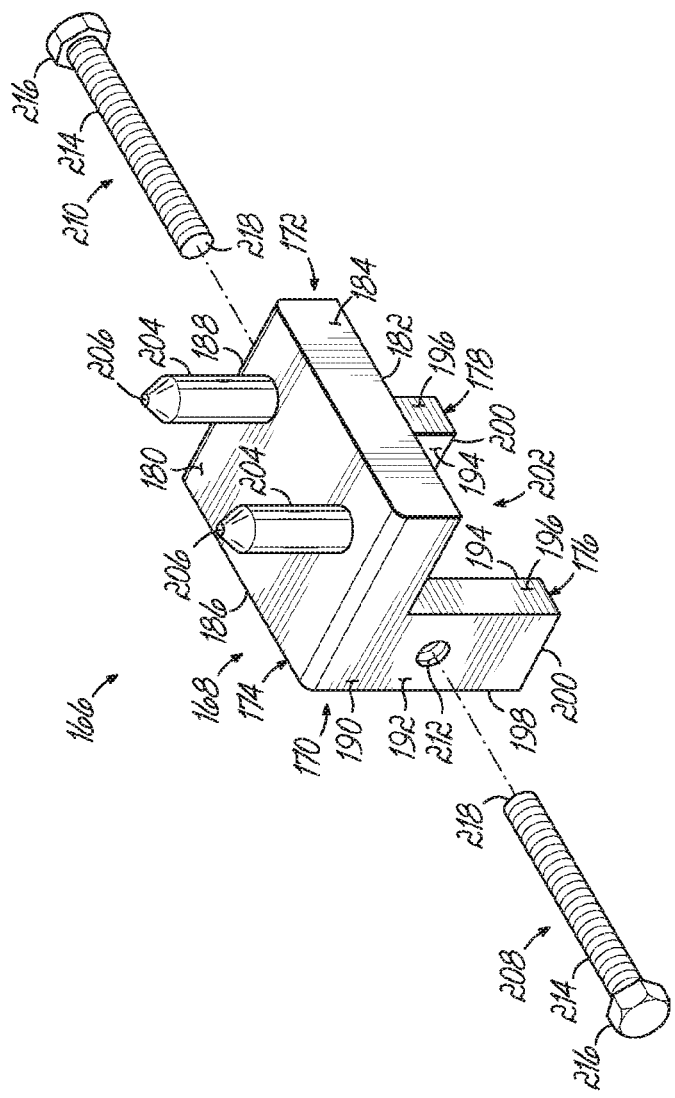
FIG. 8 is a disassembled perspective view of an adaptor in accordance with an embodiment of the invention.

FIGS. 8-8D illustrate an adaptor 166 in accordance with an exemplary embodiment of the invention. The adaptor 166 includes an adaptor body 168 including a bracket portion 170 for attaching to the J-hook 100 and a projection portion 172 for attaching to the transport frame 26. The adaptor body 168 may be formed from metal, such as steel, and be formed as an integral body or as separate elements coupled together, such as by welding, to form the adaptor body 168. Other materials may also be possible. The adaptor body 168 includes an upper base plate 174 and two side legs 176, 178 extending from the base plate 174. In one embodiment, the side legs 176, 178 extend from the base plate 174 at about 90 degrees (i.e., perpendicularly). However, the side legs 176, 178 may extend from the base plate 174 at other angles in alternative embodiments. In an exemplary embodiment, the base plate 174 and side legs 176, 178 may have a generally rectangular cross-sectional profile, but may have other cross-sectional profiles in alternative embodiments, such as circular, oval, square, triangular, or other polygonal profiles. In one embodiment, the base plate 174 may include an outer surface 180, an opposed inner surface 182, a front surface 184, an opposed rear surface 186, and opposed side surfaces 188, 190. The side legs 176, 178 extend from the inner surface 182 of the base plate 174 and include an outer surface 192, an opposed inner surface 194, a front surface 196, an opposed rear surface 198, and an end surface 200 opposed to where the legs 176, 178 attach to the base plate 174. The combination of the base plate 174 and side legs 176, 178 forms a generally inverted U-shaped recess 202.

In one embodiment (not shown), the side legs 176, 178, may be coextensive with the base plate 174 in length from the front surface 184 to the rear surface 186. In an alternative embodiment, however, and as illustrated in FIGS. 8-8D, the side legs 176, 178 may have a length less than the length of the base plate 174. Moreover, in an exemplary embodiment the side legs 176, 178 may extend from base plate 174 adjacent the rear surface 186 of the base plate 174. In alternative embodiments, however, the side legs 176, 178 may extend from the base plate 174 at other locations between the front and rear surfaces 184, 186. In an exemplary embodiment, the side legs 176, 178 are generally aligned with each other across the base plate 174, as illustrated in FIGS. 8-8D. Aspects of the adaptor 166, however, are not so limited and the side legs 176, 178 may be spaced apart or offset from each other in the length direction of the base plate 174.

As illustrated in the figures, the outer surface 180 of the base plate 174 includes one or more locating projections 204 (two shown) extending away from the surface 180. As will be explained in more detail below, the projections 204 facilitate a connection between the adaptor 166 and the transport frame 26 at a predetermined location of the transport frame 26. The projections 204 may be configured as pegs, posts, fingers, tabs, etc. extending from the outer surface 180 of the base plate 174 of the adaptor 166. The projections 204 may have a wide range of lengths and cross-sectional profiles. For example, each of the one or more projections 204 may include a generally cylindrical post having a circular cross-sectional profile. In an exemplary embodiment, a first, lower portion of the projections 204 adjacent the outer surface 180 may include a generally constant diameter section and a second, outer portion of the projections 204 may include a generally conical section that terminates at a tip 206. The tapered configuration of the projections 204 guides the projections 204 into complementary recesses or apertures in the transport frames 26, as will be discussed in more detail below. The projections 204, however, are not limited to this configuration and may have other configurations for engaging with complementary receivers in the transport frames 26.

As further shown in FIGS. 8-8D, to provide lateral adjustability, the adaptor 166 further includes a pair of set screws 208, 210 associated with respective side legs 176, 178. More particularly, each of the side legs 176, 178 includes a threaded bore 212 extending between the outer surface 192 and the inner surface 194 and configured to receive respective set screws 208, 210 therein. In an exemplary embodiment, the threaded bores 212 may be generally parallel to the base plate 174 and be positioned along the side legs 176, 178 adjacent the base plate 174. By way of example, the threaded bores 212 may be immediately adjacent the inner surface 182 of the base plate 174. However, positions slightly spaced from the inner surface 182 may also be possible. The set screws 208, 210 include a threaded shaft 214, an enlarged head 216, and an abutment end 218 configured to engage with the J-hook 100 in a manner described below. The enlarged heads 216 are outboard of the outer surfaces 192 of the side legs 176, 178 and the abutments ends 218 are positioned in the U-shaped recess 202 between the side legs 176, 178. As is readily understood, rotation of the set screws 208, 210 moves the abutment ends 218 toward and away from each other.

Figure 9:
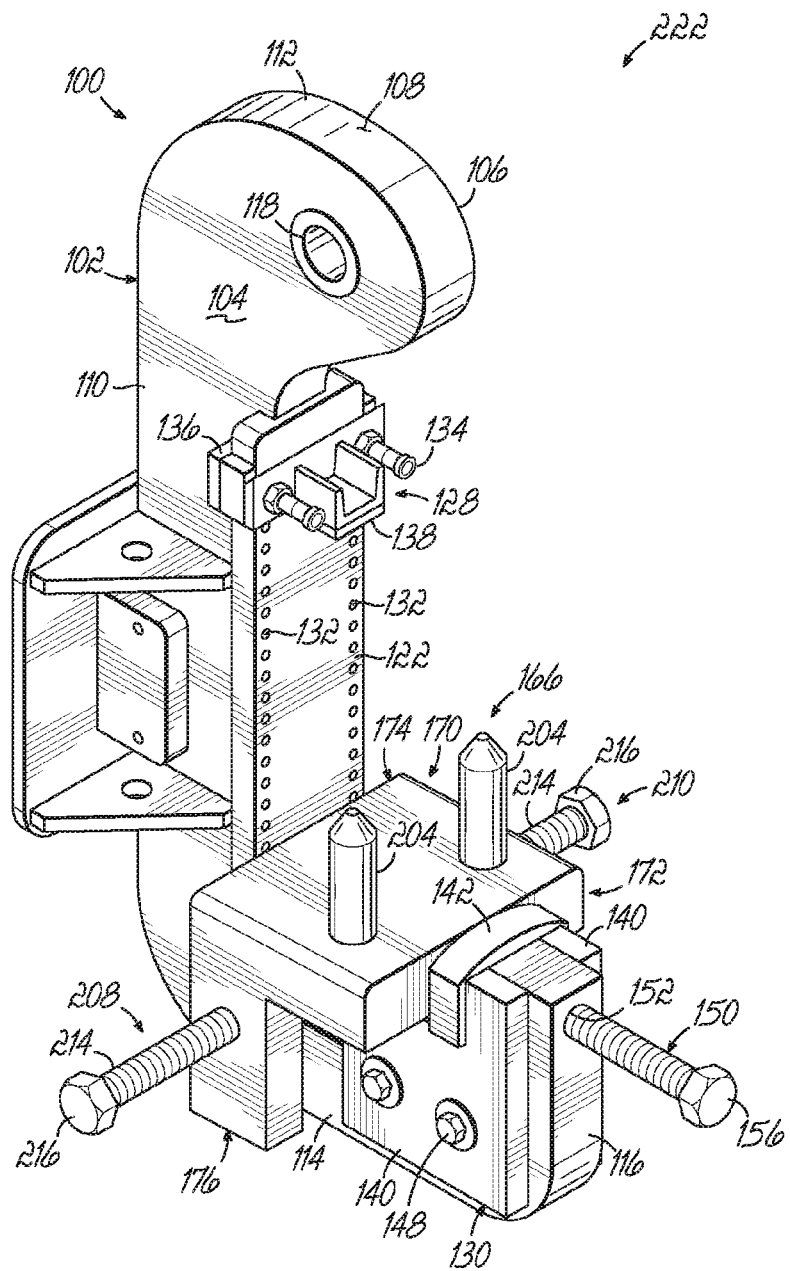
FIG. 9 is a perspective view of a J-hook assembly in accordance with an embodiment of the invention.

FIG. 9 illustrates the adaptor 166 coupled to the J-hook 100 to form a J-hook assembly 222 for mating to the transport frames 26 of the nacelle assembly 24. In this regard, the adaptor 166 is placed over the second engagement plate 124 and disposed between the first engagement plate 122 and the second lock jaw 130 such that the inner surface 182 of the base plate 174 engages with the second engagement plate 124 of the J-hook 100. In this position, the side legs 176, 178 project downwardly from the base plate 174 such that the inner surfaces 194 of the side legs 176, 178 confront the first and second faces 104, 106 of the second leg 114 of the J-hook 100. The distance between the inner surfaces 194 of the side legs 176, 178 (i.e., the width of recess 202) is greater than the width of the second leg 114 of the J-hook 100 (i.e., the distance between the first and second faces 104, 106 of the J-hook 100 along the second leg 114). In this way, the adaptor 166 is movable laterally relative to the J-hook 100. This lateral movement is bounded on one side by the engagement of the first side leg 176 with the first face 104 of the J-hook 100 and bounded on the other side by the engagement of the second side leg 178 with the second face 106 of the J-hook 100. If the centre of gravity 158 of the nacelle assembly 24 is within this lateral range of the adaptor 166 on the J-hook 100, then the lifting apparatus 30 will be able to hoist the nacelle assembly 24 in a balanced configuration.

To this end, the goal is to align the eyelet 118 of the J-hook 100, and more particularly the lifting cable 36 of the lifting apparatus 30, with the laterally offset centre of gravity 158 of the nacelle assembly 24. If the lateral offset 62 of the centre of gravity 158 of the nacelle assembly 24 is known, then the adaptor 166 may be secured to the J-hook 100 in an asymmetric manner (that is with the adaptor 166 shifted laterally to one side or the other of the second leg 114 of the J-hook 100) such that the centre of gravity 158 of the nacelle assembly 24 is vertically aligned with the eyelet 118 of the J-hook 100. In this regard, once the adaptor 166 is offset by the appropriate amount, the first and second set screws 208, 210 may be tightened until the abutment ends 218 engage the respective faces 104, 106 of the J-hook 100. The second lock jaw 130 of the J-hook 100 may then be moved into position such that the bearing surface 144 of the bearing pad 142 engages the front surface 184 of the base plate 174 of the adaptor 166 to clamp the adaptor 166 against the first engagement plate 122 at the rear surface 186 of the base plate 174. However, the clamping of the adaptor 166 with the second lock jaw 130 may be optional. In any event, between the set screws 208, 210 and possibly the second lock jaw 130, the adaptor 166 may be securely attached to the J-hook 100 in the desired offset configuration.

Figure 10B:
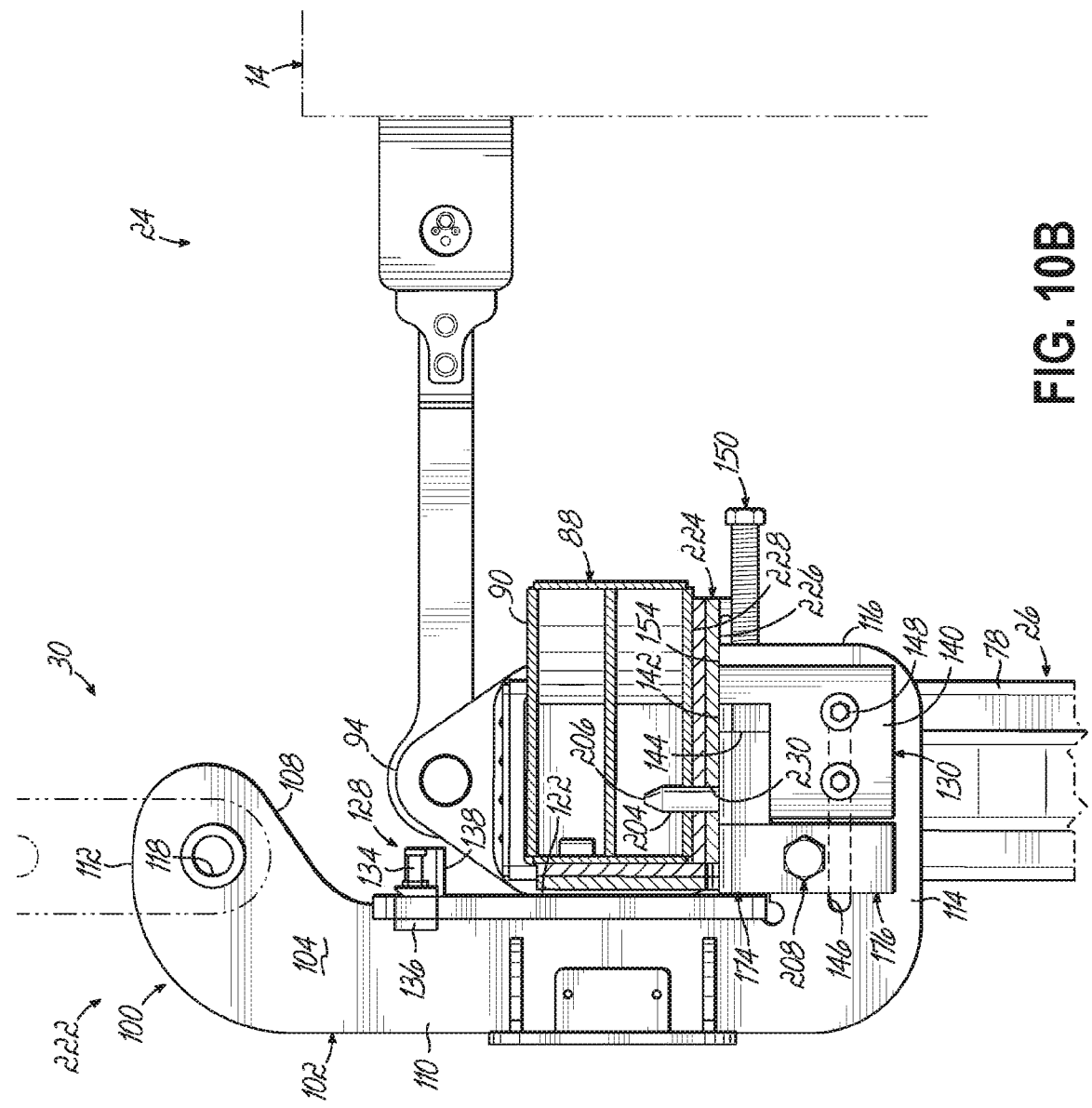

FIGS. 10A and 10B illustrate the use of the J-hook assembly 222 in handling a nacelle assembly 24. To this end and as illustrated in these figures, the transport frames 26 include a connection interface 224 (FIG. 4) for mating with the adaptor 166 on the J-hook assembly 222. In an exemplary embodiment, the connection interface 224 includes one or more face plates 226 attached to the underside 228 of the upper cross beam 88 of the transport frames 26. The face plates 226 may be made of metal, such as steel, and either welded or bolted to the upper cross beam 88. The face plates 226, and possibly the upper cross beam 88, includes one or more apertures 230 configured to receive the one or more projections 204 on the J-hook assembly 222. To this end, the lifting apparatus 30, such as one of the cranes 34, 40 may maneuver the J-hook assembly 222 outside of and adjacent to the transport frame 26 such that the projections 204 of the adaptor 166 are just below the upper cross beam 88 of the transport frame 26. This arrangement is illustrated in FIG. 10A. Service personnel on the ground may then position the J-hook assembly 222 such that the projections 204 engage with the apertures 230 in the connection interface 224 as the J-hook assembly 222 is slightly raised by the lifting apparatus 30, thereby attaching the J-hook assembly 222 to the transport frame 26. The same process may be used to attach the other J-hook assembly 222 to the other transport frame 26 on the other side of the nacelle assembly 24. This arrangement is illustrated in FIG. 10B.

It is noted that the connection between the J-hook assembly 222 and the transport frame 26 is tool-less, which provides certain benefits compared to current methods. In any event, after connecting the J-hook assemblies 222 to the transport frames 26, the nacelle assembly 24 may then be moved from one location to another location using the lifting apparatus 30. At the new location, the J-hook assemblies 222 may be disengaged from the transport frames 26 by lowering the J-hook assemblies 222 so that the projections 204 disengage the apertures 230.

Figure 11:
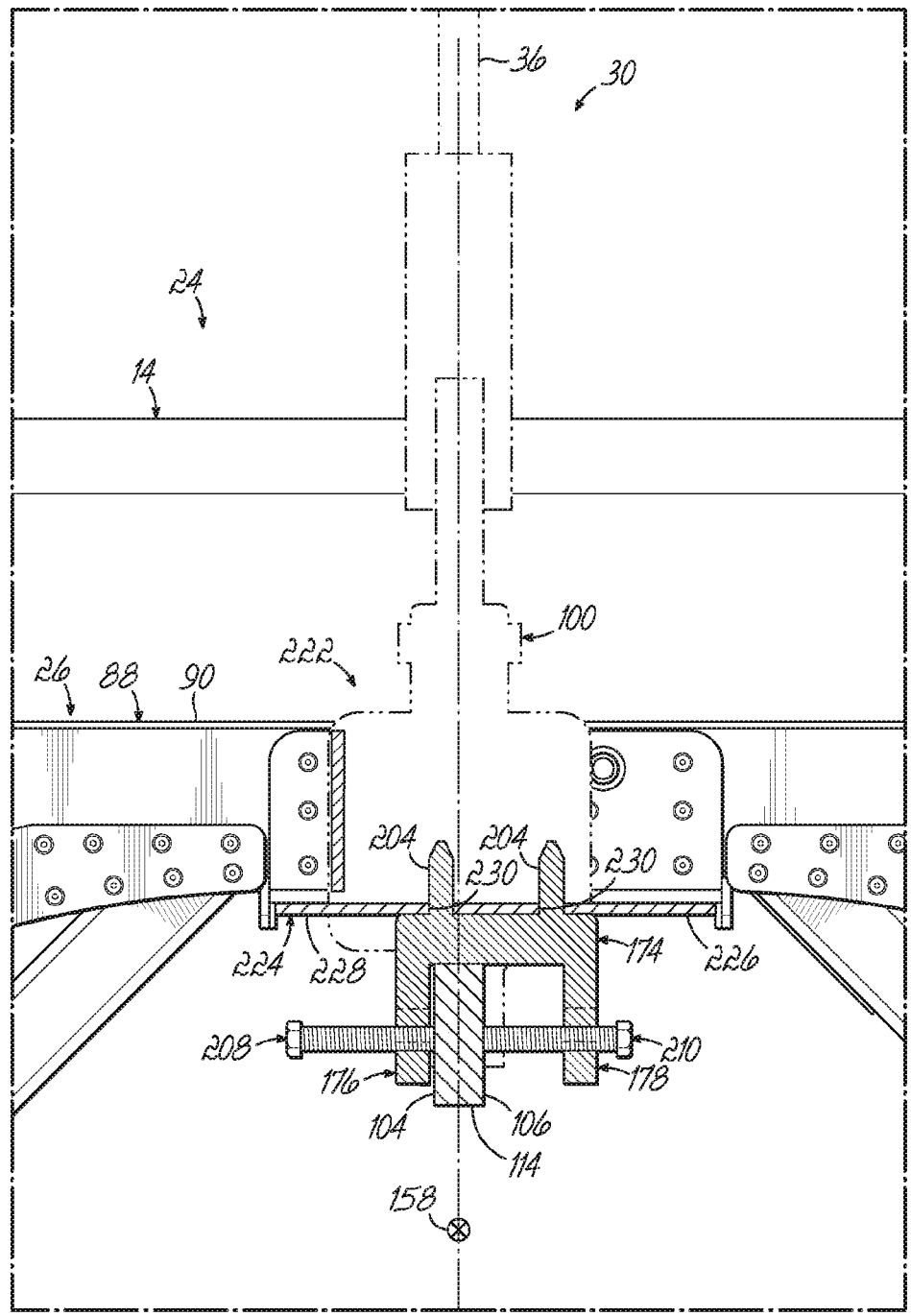
FIG. 11 is a partial cross-sectional end view of the nacelle assembly illustrating a lateral offset of the adaptor relative to the J-hook for a balanced lift of a nacelle assembly.

FIG. 11 illustrates the adaptor 166 in a laterally offset configuration relative to the J-hook 100 such that the centre of gravity 158 of the nacelle assembly 24 is vertically aligned with the eyelet 118 of the J-hook 100 and the lifting cable 36. Accordingly, when the nacelle assembly 24 is lifted off the support surface 28, such as the ground or stand, the nacelle assembly 24 does not tilt or otherwise rotate. The ability to adjust the lateral position of the adaptor 166 on the J-hook 100 is what allows the nacelle assembly 24 to be hoisted by the lifting apparatus 30 in a balanced configuration that avoids the tilting of the nacelle assembly 24 during the lift. As noted above, if the lateral offset of the centre of gravity 158 of the nacelle assembly 24 is known, then the adaptors 166 may be arranged on the J-hooks 100 to correspond to the lateral offset and achieve a balanced lift.

Figure 12:
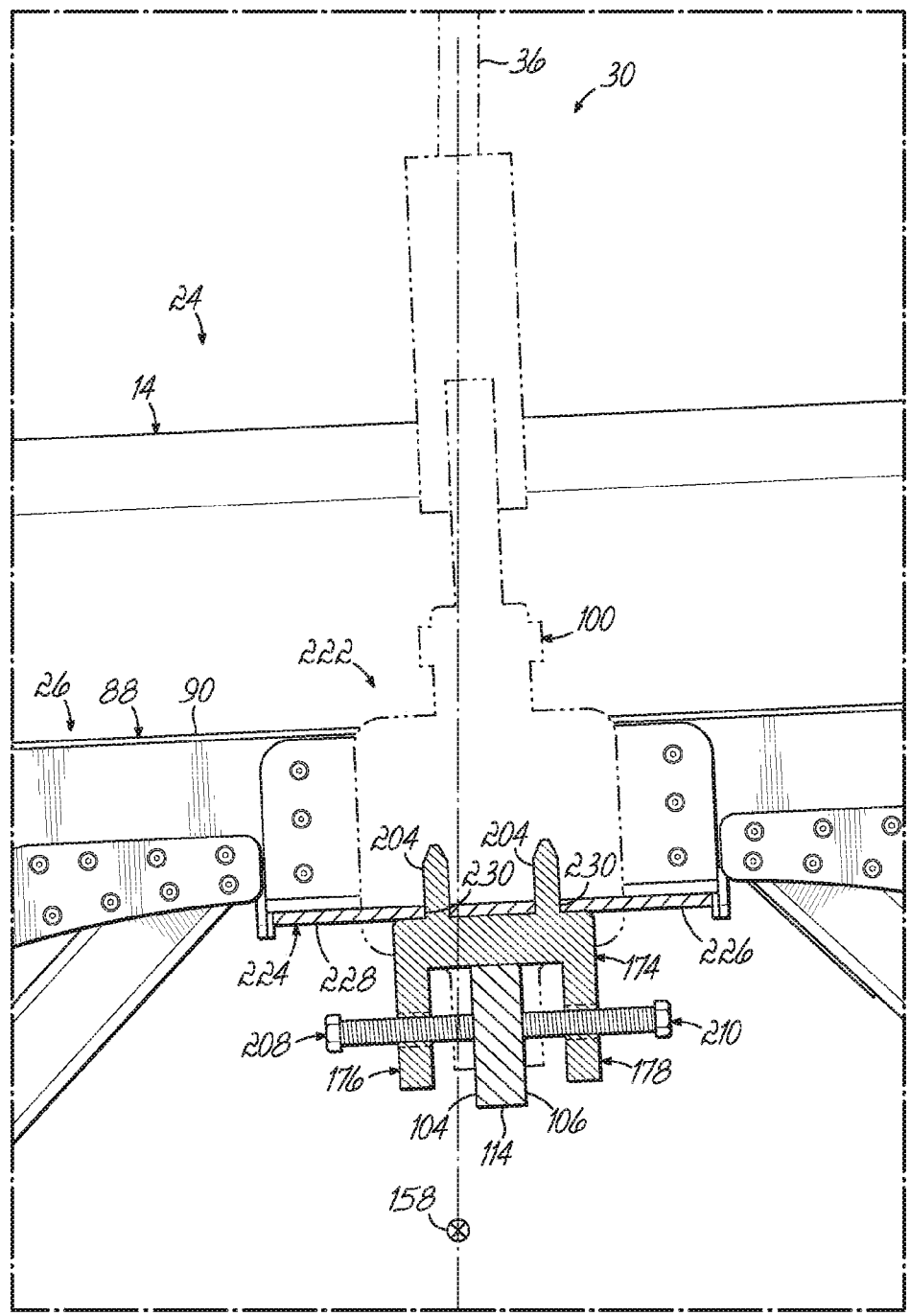
FIG. 12 is a partial cross-sectional end view of the nacelle assembly illustrating the adaptor and J-hook during an iterative process to a balanced configuration.

If, on the other hand, the centre of gravity 158 of the nacelle assembly 24 is not precisely known, an initial offset position of the adaptor 166 on the J-hooks 100 may be made. The lifting apparatus 30 may then lift the nacelle assembly 24 to determine whether the assembly 24 starts to tilt upon being lifted off the support surface 28. FIG. 12, for example, illustrates a scenario where the initial offset for the adaptor 166 relative to the J-hook 100 is selected to be zero (i.e., the adaptor 166 is centrally positioned on the second engagement plate 124 of the J-hook 100) and, as a consequence, the nacelle assembly 24 tilts as the assembly 24 is being lifted by the lifting apparatus 30. In this case, the nacelle assembly 24 may be lowered back to the support surface 28, the adaptors 166 adjusted to change the initial lateral offset value relative to the J-hooks 100 (i.e., moving the adaptors 166 laterally in one direction or the other depending on which way the nacelle assembly 24 tilts), and the nacelle assembly 24 raised again with the lifting apparatus 30. This iterative or trial-and-error process may be repeated until the appropriate lateral offset is found that vertically aligns the centre of gravity 158 of the nacelle assembly 24 and the eyelet 188 of the J-hooks 100 and/or the lifting cables 36 of the lifting apparatus 30 and tilting of the nacelle assembly 24 is eliminated upon being hoisted by the lifting apparatus 30.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. Thus, the various features of the invention may be used alone or in any combination depending on the needs and preferences of the user.

The invention claimed is:

1. An adaptor for interfacing between an endpiece of a lifting apparatus and a nacelle of a wind turbine, comprising:
a base plate having an outer surface and an inner surface, the outer surface having one or more projections configured to engage the adaptor to the nacelle;
a first side leg extending away from the inner surface of the base plate, wherein the first side leg includes an outer surface, an inner surface, and a first bore extending between the inner and outer surfaces of the first side leg;
a second side leg extending away from the inner surface of the base plate and spaced from the first side leg, wherein the second side leg includes an outer surface, an inner surface, and a second bore extending between the inner and outer surfaces of the second side leg, and wherein the base plate, first side leg, and second side leg collectively define a recess configured to engage the adaptor with the endpiece of the lifting apparatus;
a first set screw positionable in the first bore such that an abutment end of the first set screw is disposed within the recess; and
a second set screw positionable in the second bore such that an abutment end of the second set screw is disposed within the recess,
wherein the first and second set screws are configured to be movable, relative to the first and second bores, respectively, toward and away from each other to adjustably position the adaptor relative to the endpiece of the lifting apparatus.

2. The adaptor of claim 1, wherein the base plate is generally rectangular and further comprises a front surface, a rear surface, and opposed side surfaces, and wherein the first and second side legs extend from the inner surface adjacent respective side surfaces of the base plate.

3. The adaptor of claim 1, wherein the first and second side legs extend from the inner surface adjacent to the rear surface of the base plate.

4. The adaptor of claim 1, wherein the first and second side legs have a length that is less than a length of the base plate.

5. The adaptor of claim 1, wherein the first and second side legs are aligned across a width of the base plate.

6. The adaptor of claim 1, wherein the first and second side legs extend from the inner surface of the base plate at a substantially right angle.

7. The adaptor of claim 1, wherein the first and second set screws and the first and second bores are threaded such that rotation moves the first and second set screws toward and away from each other.

8. The adaptor of claim 1, wherein the first bore and the second bore extend through their respective side legs in a direction parallel to the base plate.

9. The adaptor of claim 1, wherein the first bore and the second bore extend through their respective side legs adjacent the inner surface of the base plate.

10. The adaptor of claim 1, wherein the first and second set screws are movable toward and away from each other along an axis, and wherein the adaptor is configured to be adjustable relative to the endpiece of the lifting apparatus in a direction parallel to the axis.

11. The adaptor of claim 1, wherein the one or more projections further comprises a plurality of posts spaced apart on the upper surface of the base plate, and wherein each of the plurality of posts has a tapered end.

12. The adaptor of claim 1, wherein the adaptor is configured to mount to the nacelle in a tool-less manner.

13. An endpiece assembly for a lifting apparatus having a lifting cable, comprising:
   an endpiece configured to be coupled to the lifting cable of the lifting apparatus, wherein the endpiece defines a lateral direction; and
   the adaptor of claim 1 mounted to the endpiece, wherein the position of the adaptor relative to the endpiece is adjustable in the lateral direction, and wherein the adaptor is coupled to the endpiece at least by the first and second set screws.

14. The endpiece assembly of claim 13, wherein the endpiece includes a J-hook.

15. The endpiece assembly of claim 14, wherein the J-hook further comprises:
   a first leg having an eyelet for attaching to the lifting cable and a first edge;
   a second leg extending from the first leg and having a second edge,
   wherein the adaptor is mounted on the second edge such that the inner surface of the base plate engages the second edge and the second leg of the J-hook is disposed in the recess between first and second side legs of the adaptor.

16. The endpiece assembly of claim 15, wherein the distance between the inner surfaces of the first and second side legs of the adaptor is greater than a thickness of the second leg of the J-hook.

17. The endpiece assembly of claim 15, wherein the J-hook includes a lock jaw for clamping the adaptor to the J-hook.

18. A method of handling wind turbine components at a facility, comprising:
   providing a lifting apparatus having a lifting cable and the endpiece assembly of claim 13 on the lifting cable for interfacing with a load for lifting with the lifting apparatus;
   providing a first wind turbine component for moving with the lifting apparatus, the first wind turbine component having a centre of gravity laterally offset from a central plane of the first wind turbine component;
   selectively disposing the adaptor between the endpiece of the lifting apparatus and the first wind turbine component, the adaptor being adjustable relative to the endpiece of the lifting apparatus in the lateral direction;
   positioning the adaptor relative to the endpiece of the lifting apparatus so that the endpiece is vertically aligned with the offset centre of gravity of the first wind turbine component; and
   lifting the first wind turbine component with the lifting apparatus.

19. The method of claim 18, wherein positioning the adaptor relative to the endpiece of the lifting apparatus further comprises:
   predetermining the lateral offset of the centre of gravity of the first wind turbine component; and
   prior to lifting the first wind turbine component, adjusting the position of the adaptor relative to the endpiece of the lifting apparatus to correspond to the predetermined lateral offset.

20. The method of claim 18, wherein positioning the adaptor relative to the endpiece of the lifting apparatus further comprises iteratively adjusting the position of the adaptor relative to the endpiece of the lifting apparatus and lifting the first wind turbine component with the lifting apparatus until the first wind turbine component fails to tilt when lifted by the lifting apparatus.

21. The method of claim 18, further comprising using the endpiece of the lifting apparatus without the adaptor to lift a second wind turbine component at the facility.

22. The method of claim 21, wherein the second wind turbine component is a tower section.

23. The method of claim 18, wherein the first wind turbine component includes a nacelle assembly, comprising:
   a nacelle having a front end and a rear end;
   a first transport frame attached to the front end of the nacelle; and
   a second transport frame attached to the rear end of the nacelle.

24. The method of claim 23, wherein the lifting apparatus comprises a dual-crane system, comprising:
   a first crane having a first lifting cable and a first endpiece; and
   a second crane having a second lifting cable and a second endpiece,
   wherein the method further comprises:
      selectively disposing a first adaptor between the first endpiece and the first transport frame of the nacelle assembly;
      positioning the first adaptor relative to the first endpiece of the lifting apparatus so that the first endpiece is vertically aligned with the offset centre of gravity of the nacelle assembly;
      selectively disposing a second adaptor between the second endpiece and the second transport frame of the nacelle assembly;
      positioning the second adaptor relative to the second endpiece of the lifting apparatus so that the second endpiece is vertically aligned with the offset centre of gravity of the nacelle assembly; and
      lifting the nacelle assembly with the dual crane system.

25. The method of claim 18, wherein the endpiece includes a J-hook.

* * * * *